United States Patent
Chang (10) Patent No.: US 8,085,366 B2
(45) Date of Patent: Dec. 27, 2011

(54) THIN FILM TRANSISTOR DISPLAY PANEL AND METHOD OF MANUFACTURING THE SAME

(75) Inventor: Sun-Young Chang, Bucheon-si (KR)

(73) Assignee: Samsung Electronics Co., Ltd. (KR)

( * ) Notice: Subject to any disclaimer, the term of this patent is extended or adjusted under 35 U.S.C. 154(b) by 373 days.

(21) Appl. No.: 12/485,748

(22) Filed: Jun. 16, 2009

(65) Prior Publication Data

US 2010/0133538 A1 Jun. 3, 2010

(30) Foreign Application Priority Data

Nov. 28, 2008 (KR) .................. 10-2008-0120019

(51) Int. Cl.
G02F 1/1335 (2006.01)
G02F 1/136 (2006.01)

(52) U.S. Cl. ........... 349/106; 349/44; 349/108; 349/109

(58) Field of Classification Search .................. 349/106, 349/44, 108, 109
See application file for complete search history.

(56) References Cited

U.S. PATENT DOCUMENTS

| | | | |
|---|---|---|---|
| 5,299,041 A | | 3/1994 | Morin et al. |
| 6,690,437 B2 * | | 2/2004 | Yamazaki et al. ............ 349/110 |
| 6,690,446 B1 * | | 2/2004 | Okamoto et al. ............ 349/181 |
| 7,851,797 B2 * | | 12/2010 | Yamazaki et al. ............ 257/59 |
| 7,864,284 B2 * | | 1/2011 | Morii et al. ................... 349/155 |

FOREIGN PATENT DOCUMENTS

| | | |
|---|---|---|
| JP | 11-212075 | 8/1999 |
| JP | 2004-118025 | 4/2004 |
| JP | 2007-240543 | 9/2007 |
| KR | 10-0310946 | 3/2001 |
| KR | 2004-0048757 | 6/2004 |
| KR | 2005-0070344 | 7/2005 |
| KR | 2006-0000279 | 1/2006 |
| KR | 2007-0077702 | 7/2007 |
| KR | 2007-0077998 | 7/2007 |
| KR | 10-0749458 | 8/2007 |
| KR | 2008-0034545 | 4/2008 |

* cited by examiner

*Primary Examiner* — Mike Qi
(74) *Attorney, Agent, or Firm* — Innovation Counsel LLP (57) ABSTRACT

A thin film transistor array panel according to an exemplary embodiment includes a first colored member overlapping a thin film transistor and a plurality of second colored members simultaneously formed on the first colored member. Accordingly, it is possible to prevent light leakage current of the thin film transistor, to easily repair deterioration of the thin film transistor, to prevent light leakage of a peripheral area and between color filters, and to form stable patterns.

22 Claims, 8 Drawing Sheets

THIN FILM TRANSISTOR DISPLAY PANEL AND METHOD OF MANUFACTURING THE SAME

CROSS-REFERENCE TO RELATED APPLICATIONS

This application claims priority to and the benefit of Korean Patent Application No. 10-2008-0120019, filed in the Korean Intellectual Property Office on Nov. 28, 2008, the entire contents of which are incorporated herein by reference.

BACKGROUND

1. Technical Field

The present invention relates to a thin film transistor array panel and a manufacturing method thereof.

2. Related Art

Liquid crystal displays are used as one type of flat panel display. A liquid crystal display has two display panels on which field generating electrodes such as pixel electrodes and common electrodes are formed and a liquid crystal layer that is interposed between the panels. In the liquid crystal display, voltages are applied to the field generating electrodes to generate an electric field over the liquid crystal layer, and the alignment of liquid crystal molecules of the liquid crystal layer is determined by the electric field. Accordingly, the polarization of incident light is controlled, thereby performing image display.

The liquid crystal display includes thin film transistors connected to corresponding pixel electrodes, a plurality of signals lines for controlling the thin film transistors, and a light blocking member to prevent reflection of ambient light. Recently, it has been suggested that the light blocking member may be formed in the thin film transistor array panel to improve transmittance and to simplify manufacturing.

The above information disclosed in this Background section is only for enhancement of understanding of the background of the invention and therefore it may contain information that does not form the prior art that is already known in this country to a person of ordinary skill in the art.

SUMMARY

A thin film transistor array panel according to an exemplary embodiment of the present invention includes: a substrate; a thin film transistor layer formed on the substrate and including a thin film transistor; a plurality of color filters formed on the thin film transistor layer; a first colored member formed on the thin film transistor layer, and having a portion overlapping the thin film transistor; and a second colored member formed on the first colored member, and having a different optical density from the first colored member, wherein the second colored member includes a first portion overlapping at least one of the color filters, and the first colored member includes a second portion overlapping the first portion.

The first portion, the second portion, and the color filter overlapping the first portion may compose a portion of a column spacer. The thickness of the column spacer may be in the range of about 3.6-4.7 µm.

The second colored member may include a sixth portion overlapping at least one of the color filters, the first colored member may include a seventh portion overlapping the sixth portion, and the sixth portion is thinner than the first portion.

The second colored member may include a third portion covering a contact hole formed in the peripheral area. The third portion and the first portion may have substantially the same thickness.

The second colored member may include a fourth portion formed between the color filters. The fourth portion may have substantially the same thickness as the color filter.

The second colored member may include a fifth portion formed on the region where the color filters are overlapped with each other. The fifth portion may have substantially the same thickness as the first colored member.

Each of the color filters may include an opening, and the overlapping portion between the first colored member and the thin film transistor may be disposed on the opening.

The optical density of the second colored member may be in the range of about 1.6-2.5 per µm. The absorbance of the first colored member may be in the range of about 1.2-1.8. The thickness of the first colored member is in the range of about 2.0-3.0 µm.

The thin film transistor array panel may include a pixel electrode formed on the thin film transistor layer, and the second colored member may be disposed on the pixel electrode.

A manufacturing method of a thin film transistor array panel according to an exemplary embodiment of the present invention includes: forming a thin film transistor layer including a thin film transistor on a substrate; forming a plurality of color filters on the thin film transistor layer; forming a first colored member having a portion overlapping the thin film transistor on the thin film transistor layer, and forming a second colored member having a different optical density from the first colored member through a photo-process on the first colored member, wherein the second colored member includes a first portion overlapping at least one of the color filters, and the first colored member includes a second portion overlapping the first portion.

The method may include forming a pixel electrode on the thin film transistor layer. The forming of the pixel electrode may be executed before the forming of the first colored member or between the forming of the first colored member and the forming of the second colored member.

According to the exemplary embodiments of the present invention, it is possible to prevent light leakage current of the thin film transistor, to easily repair deterioration of the thin film transistor, to prevent light leakage of a peripheral area and between color filters, and to form stable patterns.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings, irrelevant portions are omitted to clearly describe the present invention, and like reference numerals designate like elements throughout the specification. Furthermore, detailed descriptions are not given for the well-known arts.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present. It will be understood that when an element such as a layer, film, region, or substrate is referred to as being "under" another element, it can be directly under the other element or intervening elements may also be present. On the contrary, when an element is referred to as being "directly under" another element, there are no intervening elements present.

A thin film transistor array panel according to an exemplary embodiment of the present invention will be described with reference to FIG. 1 and FIG. 2.

Figure 1:
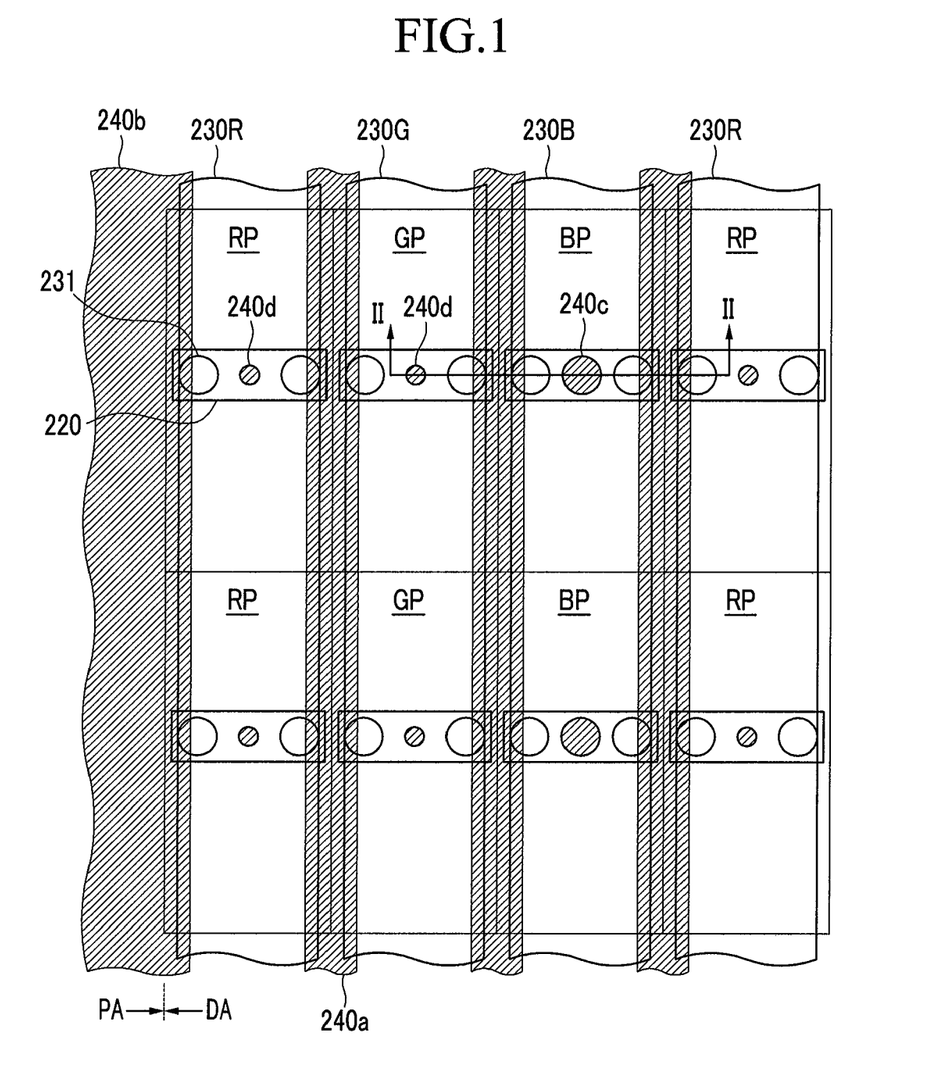
FIG. 1 is a layout view of a thin film transistor array panel, according to an exemplary embodiment of the present invention.

FIG. 1 is a layout view of a thin film transistor array panel, according to an exemplary embodiment of the present invention. FIG. 2 is a cross-sectional view of the thin film transistor array panel shown in FIG. 1 taken along the line II-II.

Figure 2:
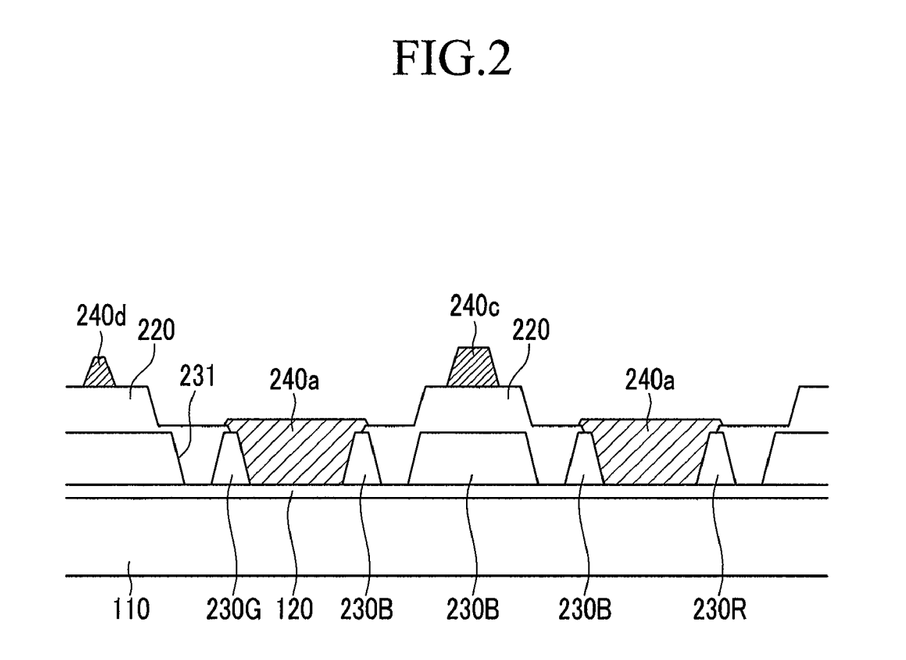
FIG. 2 is a cross-sectional view of the thin film transistor array panel shown in FIG. 1 taken along the line II-II.

Referring to FIG. 1 and FIG. 2, a thin film transistor array panel is divided in a plurality of pixel areas RP, GP, and BP, and the pixel areas RP, GP, and BP are arranged into a matrix. Each of pixel areas RP, GP, and BP displays at least one primary color so that a desired color can be recognized by the spatial or temporal sum of the primary colors. For example, the primary colors may be three primary colors, such as red, green, and blue colors.

A display area DA of the thin film transistor array panel is a pixel area that is adapted to output images, and the peripheral area PA is disposed outside of the display area DA. A thin film transistor layer 120 is formed on an insulating substrate 110. The insulating substrate 110 may comprise transparent glass or plastic. The thin film transistor layer 120 includes one or more thin film transistors.

Color filters 230R, 230G, and 230B, respectively extending in a column direction with a band shape and separated from each other, are formed on the thin film transistor layer 120. However, in one implementation, the color filters 230R, 230G, and 230B may be overlapped with each other, and the operation of the liquid crystal molecules may be normal on the overlapping position. A plurality of pixel areas RP are aligned with a column direction, as shown in FIG. 1. A plurality of pixel areas GP and a plurality of pixel areas BP are respectively aligned with a column direction. However, at least two of the pixel areas RP, GP, and BP may be aligned with one column direction. Each of the color filters 230R, 230G, and 230B may have a band shape, as shown in FIG. 1. However, each of the color filters 230R, 230G, and 230B may have an island shape. Alternatively, the shape and arrangement of the pixel areas RP, GP, and BP, and the color filters 230R, 230G, and 230B may be variously changed. In various embodiments, the thickness of the color filters 230R, 230G, and 230B may be in the range of about 2.8-3.2 μm.

In one embodiment, the color filters 230R, 230G, and 230B, respectively, include two openings 231 near the central portion of the pixel areas RP, GP, and BP. Alternatively, in another embodiment, the openings 231 may be respectively disposed on the upper and lower portions of the pixel areas RP, GP, and BP, and each of the pixel areas RP, GP, and BP may have a single opening 231. Thin film transistors (not shown) formed in the thin film transistor layer 120 may overlap the openings 231 one by one. Alternatively, the number and arrangement of the openings 231 and thin film transistors may be variously changed, without departing from the scope of the present embodiment. However, the openings 231 may not exist, and in this case, a first colored member 220 may be formed at the position where the thin film transistor is disposed.

In one embodiment, the first colored members 220 are respectively formed for every pixel area RP, GP, and BP on the color filters 230R, 230G, and 230B, one by one. Alternatively, in another embodiment, the first colored members 220 may be disposed under the color filters 230R, 230G, and 230B. In both cases, the first colored member 220 covers at least a portion of the thin film transistor. Accordingly, the position of the first colored member 220 may be variously changed according to the arrangement of the thin film transistor. The first colored members 220 cover all the openings 231 of the pixel areas RP, GP, and BP, and have a plane shape of an approximate rectangle. However, the plane shape of the first colored member may vary to include other shapes, such as an oval shape.

According to one or more embodiments of the present disclosure, optical density is defined as a value of absorbance divided by thickness in a μm unit. The absorbance is divided as a log10 ($I_0/I$), where I means a light intensity after light having an intensity of $I_0$ passes through the special material. The absorbance of the first colored members 220 formed on the color filters 230R, 230G, and 230B may be in the range of about 1.2-1.8, the thickness thereof may be in the range of about 2.0-3.0 μm, and the optical density may be in the range of about 0.4-0.9 per μm. Specifically, the absorbance, the thickness, and the optical density may be in the range of about 1.3-1.7, about 2.2-2.8, and about 0.5-0.8, respectively. Here, in one aspect, the first colored members 220 may include a photosensitive organic material that may be colored. In this case, since the first colored members 220 are adapted to block light, the light leakage current generated in the thin film transistor is prevented. Also, since the first colored members 220 transmit the light (laser) used to repair a thin film transistor that is abnormally operated, the repair of the thin film transistor is easy. Also, since it is not necessary to apply a photo-process using a half mask including slits to form the first colored member 220, the pattern of the first colored member 220 is stably formed. For example, the first colored member 220 may have absorbance of about 1.5, the thickness thereof may be about 2.5 μm, and the optical density thereof may be about 0.6 per μm.

In one embodiment, second colored members 240a, 240b, 240c, and 240d having a different optical density from that of the first colored member are formed on the first colored member 220. The second colored members 240a, 240b, 240c, and 240d include the same material, and may be simultaneously formed in the same process sequence. The optical density of the second colored members 240a, 240b, 240c, and 240d may be in the range of about 1.6-2.5 per µm, specifically, about 1.8-2.3. The second colored members 240a, 240b, 240c, and 240d may include a portion having various functions. For example, the first portion 240c or the sixth portion 240d overlaps at least one of the color filters 230R, 230G, and 230B, the third portion 240b covers a contact hole formed in the peripheral area, and the fourth portion 240a is disposed between the color filters 230R, 230G, and 230B. Also, when the color filters 230R, 230G, and 230B are overlapped with each other, the fifth portion (not shown) is disposed on the overlapping region, and the fifth portion may be formed similar to the second colored member 240a of FIG. 9 in this case. Also, the first colored member 220 may include the second portion overlapping the first portion 240c, and the seventh portion overlapping the sixth portion 240d. However, at least a portion of the second colored members 240a, 240b, 240c, and 240d may be omitted. For example, the fourth portion 240a disposed between the color filters 230R, 230G, and 230B may be omitted, and the sixth portion 240d formed on the first colored member 220 may be omitted. Alternatively, various combinations of the generation and omitting are possible.

The fourth portion 240a disposed between the color filters 230R, 230G, and 230B functions as a light blocking member adapted to prevent light leakage between the color filters 230R, 230G, and 230B. When the material for the second colored members 240a, 240b, 240c, and 240d is coated and exposed with substantially the same amount, the interval between the color filters 230R, 230G, and 230B are narrow such that the fourth portion 240a has a greater thickness than the first portion 240c, the sixth portion 240d, or the third portion 240b. Accordingly, the fourth portion 240a functions to planarize the color filters 230R, 230G, and 230B. Also, in this case, the fourth portion 240a may be formed by using a mask including a transmittance region where the light is transmitted, or a light blocking region where the light is blocked such that the fourth portion 240a is stably formed. For example, when the thickness of the color filters 230R, 230G, and 230B is about 3 µm, and the thickness of the first portion 240c and the third portion 240b formed on the blue color filter 230B is about 2 µm, the thickness of the fourth portion 240a may be about 3 µm.

The first portion 240c and the sixth portion 240d that are formed on the first colored member 220 and overlap at least a portion of the first colored member 220 compose at least a portion of a columnar spacer along with the first colored member 220 and the color filters 230R, 230G, and 230B. When the openings 231 are respectively formed in the openings 231 of the color filters 230R, 230G, and 230B, the first portion 240c and the sixth portion 240d may be disposed near the openings 231. The first portion 240c formed on the blue color filter 230B composes the portion of the main columnar spacer having a compression characteristic as a main spacer with the second portion of the first colored member 220 and the blue color filter 230B formed under the first portion 240c. Here, in one aspect, the sum of the thickness of the first portion 240c and the first colored member 220 may be about 3.6-4.7 µm. For example, the thickness of the first portion 240c may be 2.0 µm, and the thickness of the first colored member 220 may be 2.5 µm. Also, the sixth portion 240d formed on the red color filter 230R or the green color filter 230G composes at least a portion of a subsidiary columnar spacer having an appropriate compression characteristic as a subsidiary spacer with the first colored member 220 and the red color filter 230R or green color filter 230G formed under the red color filter 230R or the green color filter 230G. Here, in one aspect, the width of the subsidiary column spacer is narrower than the width of the main column spacer and the height of the subsidiary column spacer may be lower than the height of the main column spacer. However, the first portion 240c may be formed on at least one of the color filters 240R, 230G, and 230B, the sixth portion 240d may also be formed on at least one of the color filters 240R, 230G, and 230B, and the sixth portion 240d may be omitted. Also, the number and arrangement of the first portion 240c and the sixth portion 240d may be variously changed.

Further, the third portion 240b disposed in the peripheral area PA covers a contact hole (not shown) for electrically connecting the wiring of the different layers such that the third portion 240b functions as the light blocking member preventing reflection of outer light through the contact hole. That is, the third portion 240b is formed after forming the contact hole such that the structure in which the reflection of the outer light can be basically prevented in the peripheral area PA may be formed. Here, in one aspect, the thickness of the third portion 240b may be substantially the same as the thickness of the first portion 240c.

Next, a thin film transistor array panel according to another exemplary embodiment of the present invention will be described with reference to FIG. 3 to FIG. 7.

Figure 3:
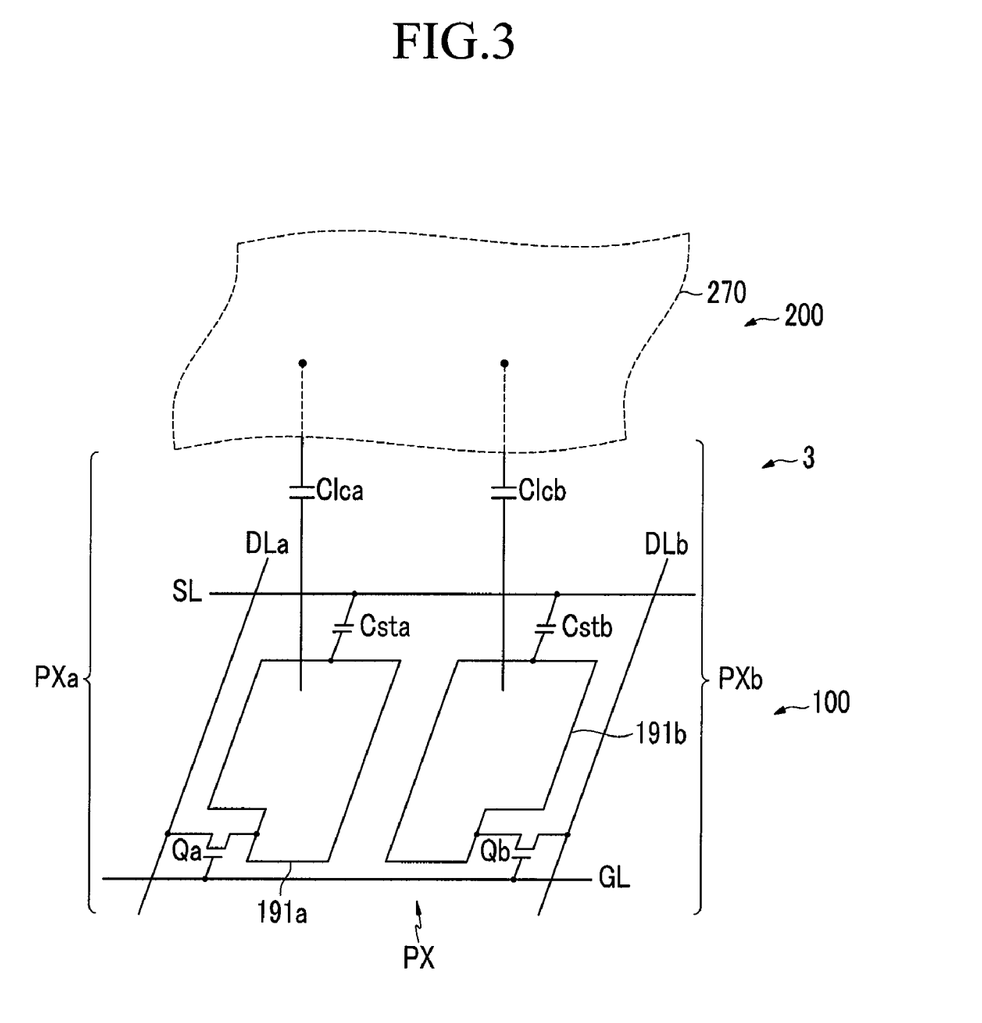
FIG. 3 is an equivalent circuit diagram of one pixel of a liquid crystal display including a thin film transistor array panel, according to an exemplary embodiment of the present invention.

FIG. 3 is an equivalent circuit diagram of one pixel of a liquid crystal display including a thin film transistor array panel according to an exemplary embodiment of the present invention. Referring to FIG. 3, a liquid crystal display according to the present exemplary embodiment includes a thin film transistor array panel 100 and a corresponding panel 200 with a liquid crystal layer 3 interposed therebetween. The thin film transistor array panel 100 includes signal lines including a plurality of gate lines GL, a plurality of pairs of data lines DLa and DLb, and a plurality of storage electrode lines SL, and a plurality of pixels PX connected to the signal lines.

Each pixel PX includes a pair of subpixels PXa and PXb. Each subpixel PXa/PXb includes a switching element Qa/Qb, a liquid crystal capacitor Clca/Clcb, and a storage capacitor Csta/Cstb.

Each switching element Qa/Qb is a three-terminal element such as a thin film transistor provided on the lower panel 100, and includes a control terminal connected to the gate line GL, an input terminal connected to the data line DLa/DLb, and an output terminal connected to the liquid crystal capacitor Clca/Clcb and the storage capacitor Csta/Cstb.

The liquid crystal capacitor Clca/Clcb uses a subpixel electrode 191a/191b and a common electrode 270 as two terminals. The liquid crystal layer 3 between the electrodes 191a/191b and 270 functions as a dielectric material.

The storage capacitor Csta/Cstb, serving as an assistant to the liquid crystal capacitor Clca/Clcb, is formed as a storage electrode line SL provided on the panel 100 and a subpixel electrode 191a/191b overlapped with an insulator interposed therebetween. A predetermined voltage, such as the common voltage Vcom, is applied thereto.

Figure 4:
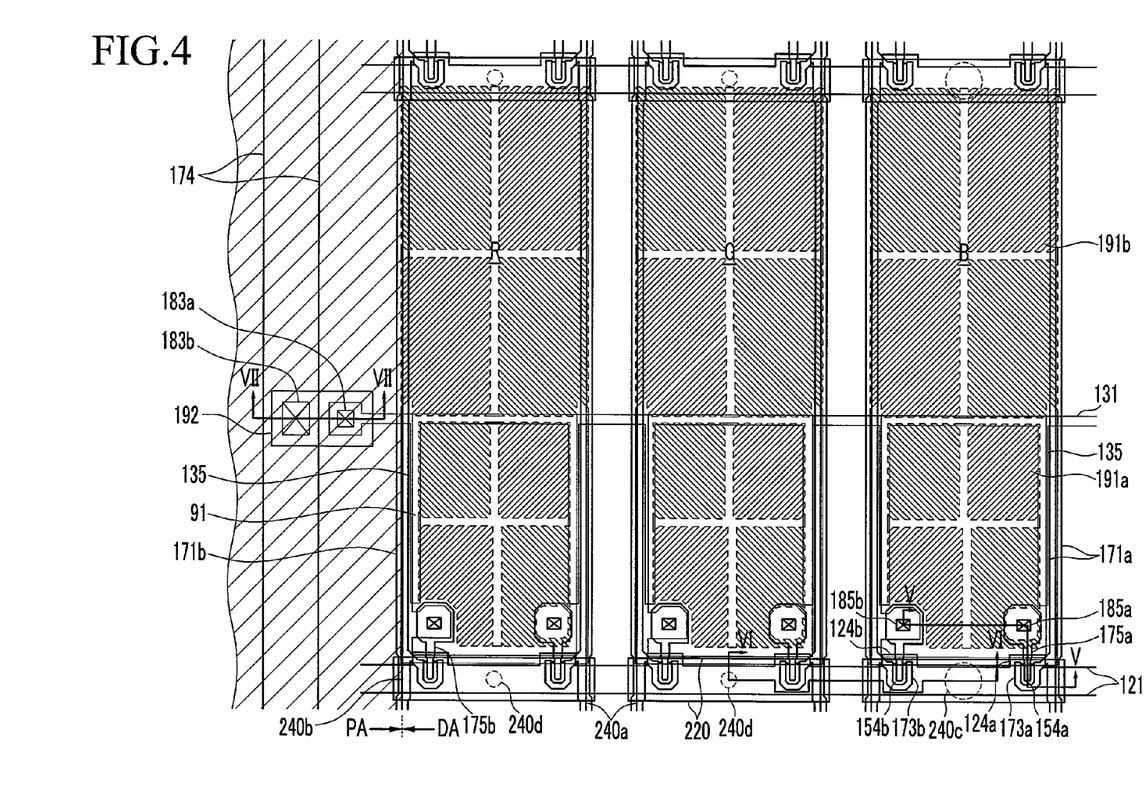
FIG. 4 is a layout view of a thin film transistor array panel, according to an exemplary embodiment of the present invention.
Figure 5:
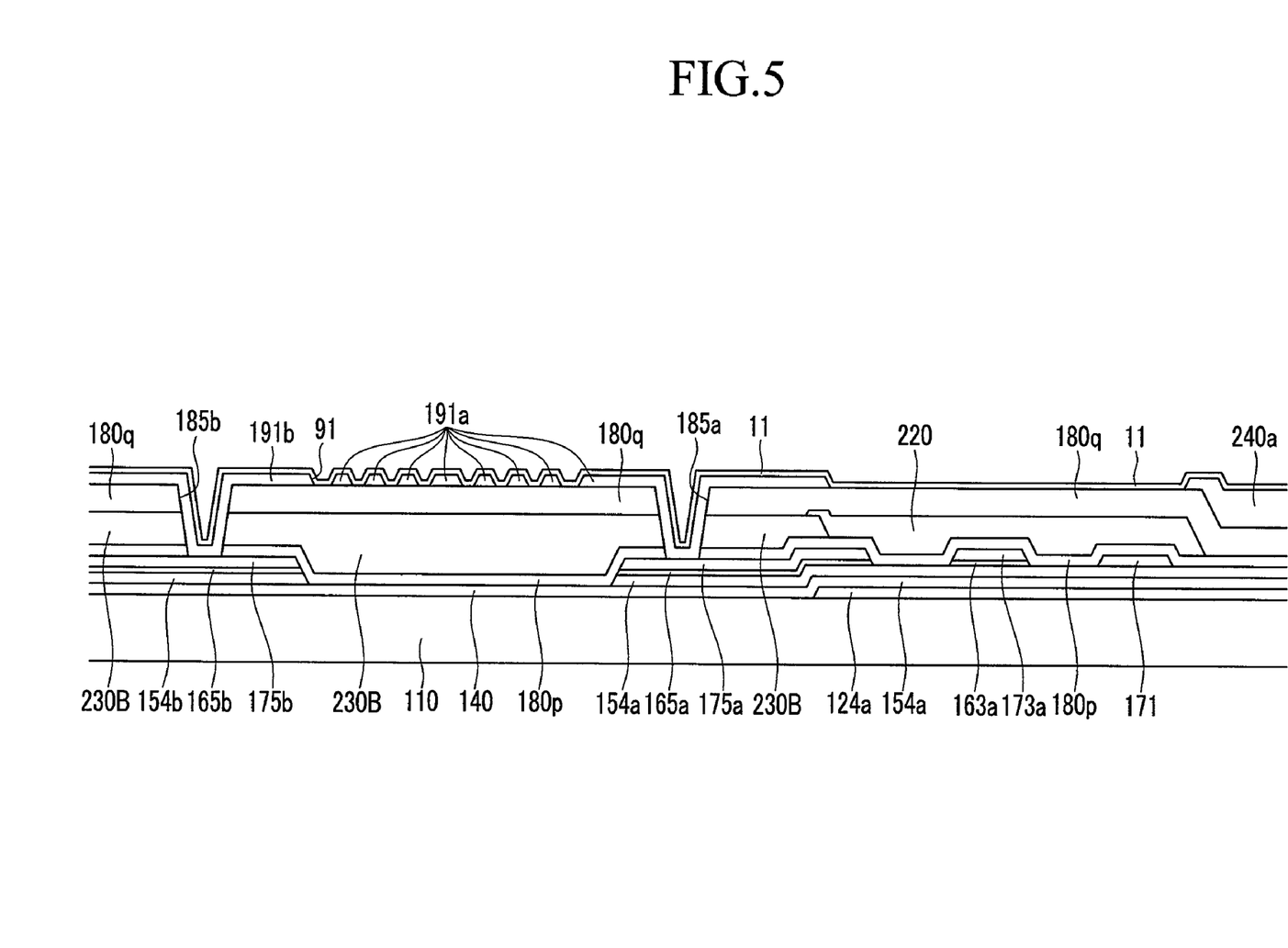
FIG. 5 is a cross-sectional view of the thin film transistor array panel shown in FIG. 4 taken along the line V-V.
Figure 6:
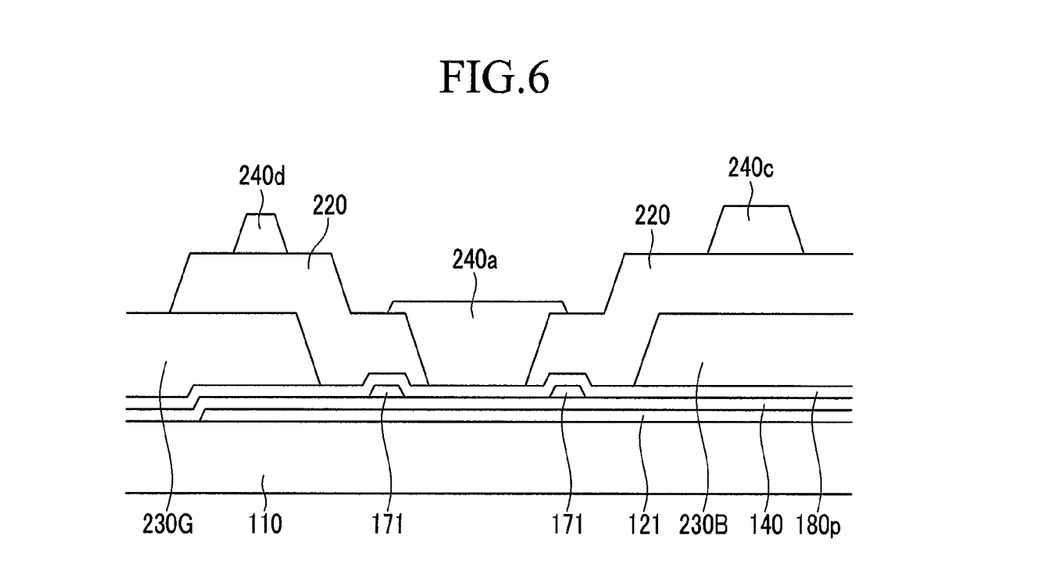
FIG. 6 is a cross-sectional view of the thin film transistor array panel shown in FIG. 4 taken along the line VI-VI.
Figure 7:
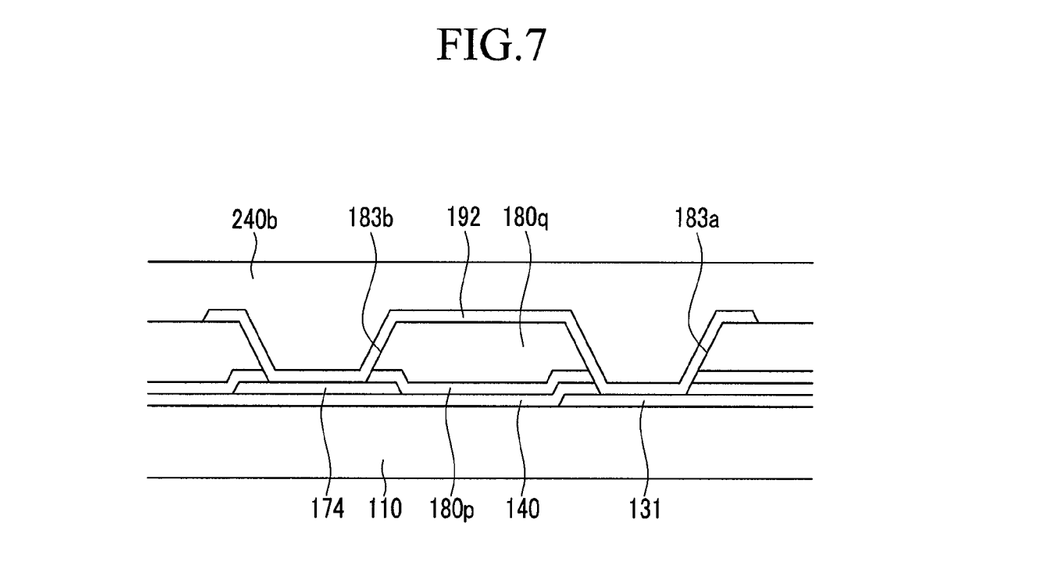
FIG. 7 is a cross-sectional view of the thin film transistor array panel shown in FIG. 4 taken along the line VII-VII.

FIG. 4 is a layout view of a thin film transistor array panel according to an exemplary embodiment of the present invention. FIG. 5 is a cross-sectional view of the thin film transistor array panel shown in FIG. 4 taken along the line V-V. FIG. 6 is a cross-sectional view of the thin film transistor array panel shown in FIG. 4 taken along the line VI-VI. FIG. 7 is a cross-sectional view of the thin film transistor array panel shown in FIG. 4 taken along the line VII-VII.

Referring to FIG. 4 to FIG. 6, a plurality of gate lines 121 and a plurality of storage electrode lines 131 and 135 are formed. The gate lines 121 transmit gate signals and substantially extend in the transverse direction. Each gate line 121 includes a plurality of first and second gate electrodes 124a and 124b protruding upward.

The storage electrode lines include a stem 131 extending substantially parallel to the gate lines 121. A plurality of storage electrodes 135 extend from the stem 131. However, the shapes and arrangements of the storage electrode lines 131 and 135 may be modified in various forms, without departing from the scope of the present disclosure.

A gate insulating layer 140 is formed on the gate lines 121 and the storage electrode lines 131 and 135, and a plurality of semiconductors 154a and 154b, preferably made of amorphous or crystallized silicon, are formed on the gate insulating layer 140. A pair of a plurality of ohmic contacts 161a, 161b, 163a, 163b, 165a, and 165b are formed on the first semiconductors 154a and 154b, and the ohmic contacts 161a, 161b, 163a, 163b, 165a, and 165b may be formed of a material, such as n+ hydrogenated amorphous silicon in which an n-type impurity is doped with a high concentration, or of a metal silicide.

A plurality of a pair of data lines 171a and 171b and a plurality of first and second drain electrodes 175a and 175b are formed on the ohmic contacts 161a, 161b, 163a, 163b, 165a, and 165b, and on the gate insulating layer 140. Also, a storage voltage supplying line 174 is formed in the peripheral area PA with the same layer as the data lines 171a and 171b. The storage voltage supplying line 174 extends in a substantially column direction and electrically connects the plurality of storage electrode lines 131.

The data lines 171a and 171b transmit data signals, extend substantially in the longitudinal direction, and cross the gate lines 121 and the stems of the storage electrode lines 131. Each data line 171a/171b includes a plurality of first/second source electrodes 173a/173b extending toward the first/second gate electrodes 124a/124b and curved with a "U" shape. The first/second source electrodes 173a/173b are opposite to the first/second drain electrodes 175a/175b with respect to the first/second gate electrodes 124a/124b.

A first/second gate electrode 124a/124b, a first/second source electrode 173a/173b, and a first/second drain electrode 175a/175b respectively form a first/second thin film transistor (TFT) Qa/Qb along with a first/second semiconductor 154a/154b.

The ohmic contacts 163b and 165b are interposed only between the underlying semiconductor islands 154a and 154b, and the overlying data lines 171a and 171b and drain electrodes 175a and 175b, and reduce contact resistance between them.

A lower passivation layer 180p preferably made of silicon nitride or silicon oxide is formed on the data lines 171a and 171b, the drain electrodes 175a and 175b, and the exposed portions of the semiconductors 154a and 154b.

Color filters 230R, 230G, and 230B, and the first colored member 220 are sequentially formed on the lower passivation layer 180p. Here, in one aspect, the above-described explanations may be equally applied to the color filters 230R, 230G, and 230B, and the first colored member 220.

An upper passivation layer 180q is formed on the first colored member 220. IN one implementation, the upper passivation layer 180q may be made of an organic material having photosensitivity. Also, the upper passivation layer 180q reduces coupling between the pixel electrodes 191 and the data lines 171a and 171b, and may have the thickness more than 1.0 µm for planarization of the substrate. In one aspect, the upper passivation layer 180q may suppress contamination of the liquid crystal by an organic material such as a solvent of the color filters 230R, 230G, and 230B such that deterioration such as an afterimage that may be generated during screen driving may be prevented.

The upper passivation layer 180q, the color filter 230B, and the lower passivation layer 180p have a plurality of contact holes 185a and 185b exposing the drain electrodes 175a and 175b. A plurality of pixel electrodes 191 and connecting members 192 are formed on the upper passivation layer 180q. In one aspect, the pixel electrodes 191 and the connecting members 192 may include the same material, such as ITO or IZO, and may be formed through the same process.

Referring to FIG. 4, each pixel electrode 191 includes the first and second subpixel electrodes 191a and 191b that are separated from each other with a gap 91 interposed therebetween. In one aspect, the overall shape of the first and second subpixel electrodes 191a and 191b comprises a quadrangle. The area occupied by the second subpixel electrode 191b may be larger than the area occupied by the first subpixel electrode 191a in the whole pixel electrode 191. Each first/second subpixel electrode 191a/191b is physically and electrically connected to the first/second drain electrode 175a/175b through the contact hole 185a/185b, and receives data voltages from the first/second drain electrode 175a/175b.

Referring to FIG. 7, the connecting member 192 electrically connects the storage electrode line 131 and the storage voltage supplying line 174 that are formed with the different layers through contact holes 183a and 183b. The second colored members 240a, 240b, 240c, and 240d are formed on the pixel electrodes 191 and the connecting members 192. The above described contents may be equally applied to the second colored members 240a, 240b, 240c, and 240d. A lower alignment layer 11 is formed on the second colored members 240a, 240b, 240c, and 240d.

Next, a thin film transistor array panel according to another exemplary embodiment of the present invention will be described with reference to FIG. 8.

Figure 8:
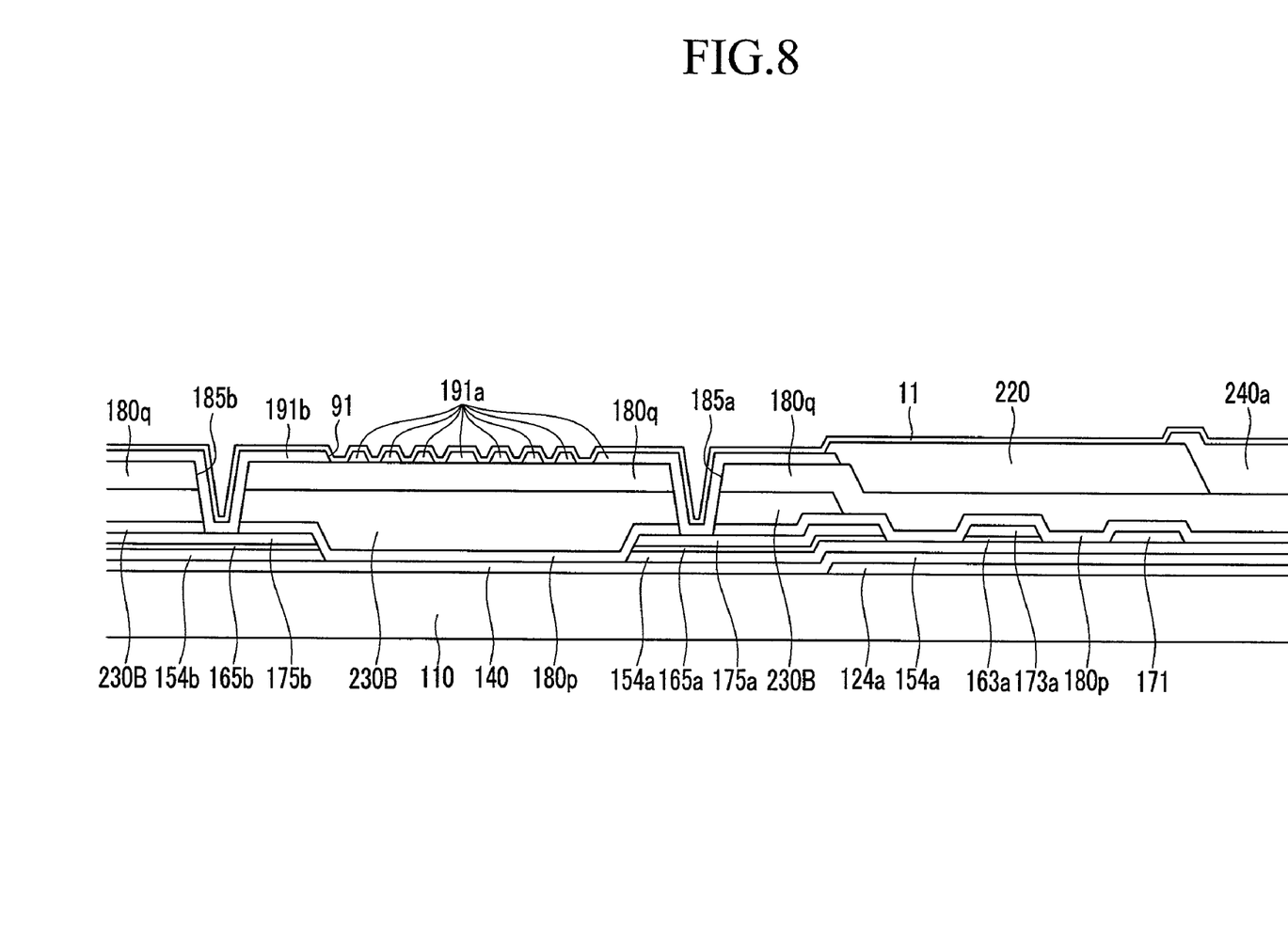
FIG. 8 is a cross-sectional view of a thin film transistor array panel, according to an exemplary embodiment of the present invention.

FIG. 8 is a cross-sectional view of a thin film transistor array panel according to an exemplary embodiment of the present invention. In the thin film transistor array panel, as shown in FIG. 3 to FIG. 4, the upper passivation layer 180q and the pixel electrode 191a are sequentially formed on the first colored member 220. However, the first colored member 220 may be formed on the pixel electrode 191a in the thin film transistor array panel of FIG. 8. That is, in the thin film transistor array panel of FIG. 8, the pixel electrode 191a is formed, and then the first colored member 220 is formed. Accordingly, the description of the above-described thin film transistor array panel of FIG. 3 to FIG. 7 may be similarly applied except for the position relationship of the first colored member 220 and the pixel electrode 191.

Next, a thin film transistor array panel according to another exemplary embodiment of the present invention will be described with reference to FIG. 8.

Figure 9:
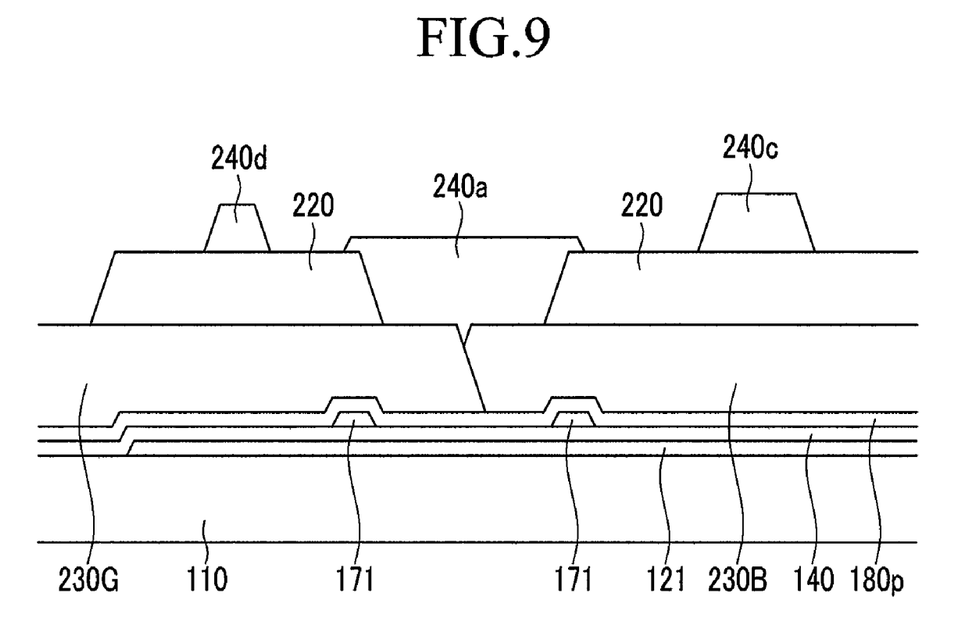
FIG. 9 is a cross-sectional view of a thin film transistor array panel, according to an exemplary embodiment of the present invention.

FIG. 9 is a cross-sectional view of a thin film transistor array panel according to an exemplary embodiment of the present invention. In the thin film transistor array panel of FIG. 3 to FIG. 4, the color filters 230R, 230G, and 230B are separated from each other. However, the color filters 230R, 230G, and 230B are overlapped with each other in the thin film transistor array panel of FIG. 9. As shown in FIG. 9, the second colored member 240a is formed on the position where the color filter 230R, 230G, and 230B are overlapped such that the liquid crystal may be normally operated on the data line 171. The description of the above-described thin film transistor array panel of FIG. 3 to FIG. 7 may be similarly applied except for the fact that the color filters 230R, 230G, and 230B are overlapped.

Next, a manufacturing method of a thin film transistor array panel according to an exemplary embodiment of the present invention will be described. The above described explanation may be similarly applied to the color filter 230R, 230G, and 230B, the first colored member 220, and the second colored members 240a, 240b, 240c, and 240d.

The thin film transistor layer 120, such as a switching element, is formed on the substrate 110. The color filters 230R, 230G, and 230B including the openings 231 are formed on the thin film transistor layer 120. The first colored member 220 including a positive or negative photosensitive material is deposited on the color filters 230R, 230G, and 230B. Next, the first colored member 220 covering all the openings 231 is patterned through a photo-process. When a negative photosensitive material is used, the region where the first colored member 220 is formed corresponds to the transmission region where the light is all transmitted on the mask, and when a positive photosensitive material is used, the region where the first colored member 220 is formed corresponds to the light blocking region where the light is all blocked on the mask. Accordingly, it is not necessary to use a half-tone mask including slits, or a semi-transparent layer, such that the stable patterning is possible. However, the first colored member 220 is firstly formed, and the color filters 230R, 230G, and 230B may then be formed.

The second colored members 240a, 240b, 240c, and 240d including the positive or negative photosensitive material is deposited on the first colored member 220. Next, the second colored members 240a, 240b, 240c, and 240d are patterned through a photo-process using one mask to be disposed between the color filters 230R, 230G, and 230B, on the color filters 230R, 230G, and 230B and in the peripheral area PA. Here, in one aspect, the region where the second colored members 240a, 240b, 240c, and 240d are formed between the color filters 230R, 230G, and 230B, on the color filters 230R, 230G, and 230B, and in the peripheral area PA corresponds to the transmission region of the mask when using the negative photosensitive material and to the light blocking region when using the positive photosensitive material. On the other hand, the region where the second colored member 240d is formed on the red color filter 230R and the green color filter 230G corresponds to a transflective region where a portion of the light is transmitted on the mask. Here, in one aspect, the second colored member 240d functions as a subsidiary column spacer such that the process margin is large. Also, the subsidiary column spacer may not be formed. Accordingly, the second colored member 240a, 240b, 240c, and 240d may be stably formed.

Furthermore, the process for forming the pixel electrode 190 and the connecting member 192 is executed. In this case, the process for forming the pixel electrode 190 and the connecting member 192 may be executed before or after the formation of the first colored member 220.

The thin film transistor layer 120 may be formed through the following method. A gate line 121 including gate electrodes 124a and 124b is formed on the substrate 110, and a gate insulating layer 140, an intrinsic amorphous silicon layer that is not doped with an impurity, an extrinsic amorphous silicon layer that is doped with an impurity, and a data conductive layer are sequentially formed on the substrate 110 including the gate line 121.

Next, a photosensitive film (not shown) is coated on the data conductive layer and is exposed and developed by using a slit mask to form a photosensitive pattern having different thicknesses. Then, the data conductive layer, the intrinsic amorphous silicon layer, and the extrinsic amorphous silicon layer are firstly etched by using the photosensitive pattern to form the semiconductors 154a and 154b. The data conductive layer is secondly etched to form the data lines 171a and 171b including the source electrodes 173a and 173b, and the drain electrodes 175a and 175b.

Next, the exposed extrinsic amorphous silicon layer is etched by using the source electrodes 173a and 173b and the drain electrode 175a and 175b as a mask to form the ohmic contact layers 161a, 161b, 163a, 163b, 165a, and 165b. Next, the lower passivation layer 180p is formed on the data lines 171a and 171b, the drain electrodes 175a and 175b, and the gate insulating layer 140. The method for forming the thin film transistor and the electrode may generally be thin film deposition and patterning by photolithography as the thin film formation method.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A thin film transistor array panel comprising:
   a substrate;
   a thin film transistor layer disposed on the substrate and comprising a thin film transistor;
   a plurality of color filters disposed on the thin film transistor layer;
   a first colored member disposed on the thin film transistor layer, the first colored member having a portion overlapping the thin film transistor; and
   a second colored member disposed on the first colored member, the second colored member having a different optical density from the first colored member,
   wherein the second colored member comprises a first portion overlapping at least one of the color filters, and
   wherein the first colored member comprises a second portion overlapping the first portion.

2. The thin film transistor array panel of claim 1, wherein the first portion, the second portion, and the color filter overlapping the first portion comprise a portion of a column spacer.

3. The thin film transistor array panel of claim 2, wherein the thickness of the column spacer is in the range of 3.6-4.7 μm.

4. The thin film transistor array panel of claim 2, wherein the second colored member comprises a sixth portion overlapping at least one of the color filters, and wherein the first colored member comprises a seventh portion overlapping the sixth portion, and wherein the sixth portion is thinner than the first portion.

5. The thin film transistor array panel of claim 1, wherein the second colored member comprises a third portion covering a contact hole disposed in the peripheral area.

6. The thin film transistor array panel of claim 5, wherein the third portion and the first portion have substantially the same thickness.

7. The thin film transistor array panel of claim 1, wherein the second colored member comprises a fourth portion interposed between the plurality of color filters.

8. The thin film transistor array panel of claim 7, wherein the fourth portion has substantially the same thickness as the color filter.

9. The thin film transistor array panel of claim 1, wherein the second colored member comprises a fifth portion disposed on the region where the color filters are overlapped with each other.

10. The thin film transistor array panel of claim 9, wherein the fifth portion has substantially the same thickness as the first colored member.

11. The thin film transistor array panel of claim 1, wherein each of the color filters comprises an opening, and wherein an overlapping portion between the first colored member and the thin film transistor is disposed on the opening.

12. The thin film transistor array panel of claim 1, wherein the optical density of the second colored member is in the range of 1.6-2.5 per μm.

13. The thin film transistor array panel of claim 1, wherein the absorbance of the first colored member is in the range of 1.2-1.8.

14. The thin film transistor array panel of claim 1, wherein the thickness of the first colored member is in the range of 2.0-3.0 μm.

15. The thin film transistor array panel of claim 1, further comprising a pixel electrode disposed on the thin film transistor layer, wherein the second colored member is disposed on the pixel electrode.

16. A method for manufacturing a thin film transistor array panel comprising:
    forming a thin film transistor layer including a thin film transistor on a substrate;
    forming a plurality of color filters on the thin film transistor layer;
    forming a first colored member having a portion overlapping the thin film transistor on the thin film transistor layer, and
    forming a second colored member having a different optical density from the first colored member through a photo-process on the first colored member,
    wherein the second colored member comprises a first portion overlapping at least one of the color filters, and
    wherein the first colored member comprises a second portion overlapping the first portion.

17. The method of claim 16, wherein the first portion, the second portion, and the color filter overlapping the first portion compose a portion of a column spacer.

18. The method of claim 16, wherein the second colored member comprises a third portion covering a contact hole formed in the peripheral area.

19. The method of claim 16, wherein the second colored member comprises a fourth portion interposed between the plurality of color filters.

20. The method of claim 16, wherein the second colored member comprises a fifth portion disposed on the region where the color filters are overlapped with each other.

21. The method of claim 16, further comprising forming a pixel electrode on the thin film transistor layer.

22. The method of claim 21, wherein the forming of the pixel electrode is executed before the forming of the first colored member or between the forming of the first colored member and the forming of the second colored member.

* * * * *